J. H. PIBURN.
AUTOMATIC LUBRICATOR.
APPLICATION FILED JULY 8, 1912.
1,064,374.
Patented June 10, 1913.
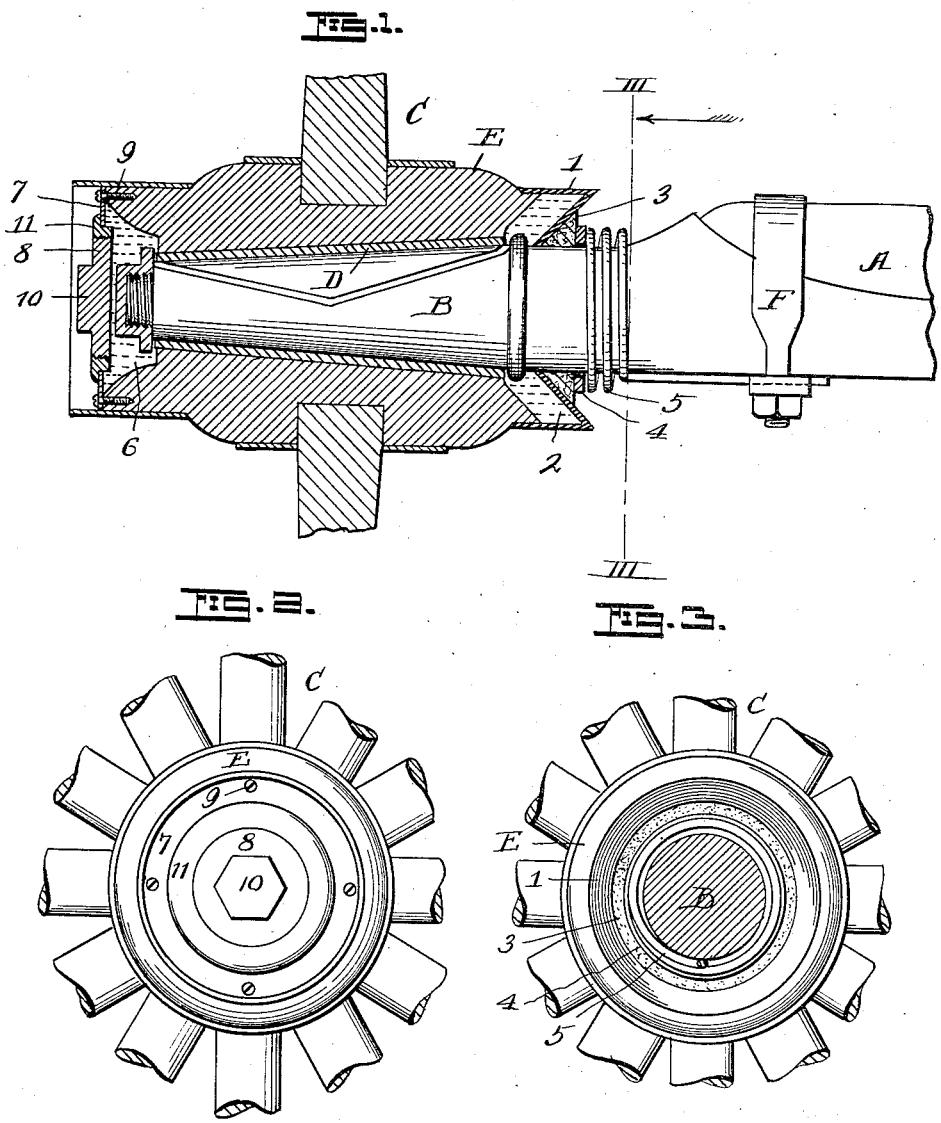
WITNESSES:
INVENTOR:
John H. Piburn,
BY
ATTORNEY.

UNITED STATES PATENT OFFICE.

JOHN H. PIBURN, OF RANDOLPH, MISSOURI.

AUTOMATIC LUBRICATOR.

1,064,374.

Specification of Letters Patent.   Patented June 10, 1913.

Application filed July 8, 1912.   Serial No. 708,190.

*To all whom it may concern:*

Be it known that I, JOHN H. PIBURN, a citizen of the United States, residing at Randolph, in the county of Clay and State of Missouri, have invented certain new and useful Improvements in Automatic Lubricators, of which the following is a specification.

My invention relates to automatic lubricators and is an improvement over an automatic lubricator for which I obtained United States Letters Patent No. 630,405.

One object of my present invention is to arrange the lubricator in such manner that it can be readily filled with a lubricant without removing the wheel containing said lubricator from its axle.

A further object is to provide a dust-proof lubricator, so that the same may be applied to advantage to farm implements and other vehicles exposed to considerable dust.

Other objects of the invention will hereinafter appear, and in order that said invention may be fully understood, reference will now be made to the accompanying drawing, in which:

Figure 1 is a broken central section of a wheel provided with my lubricator. Fig. 2 is a broken side elevation of a wheel provided with the lubricator. Fig. 3 is a vertical section on line III—III of Fig. 1.

A designates an axle; B the spindle of said axle; C a wheel mounted upon spindle B, and D an axle-box fitting within the hub E of the wheel and journaled upon the spindle B. All of the foregoing parts may be of ordinary construction.

1 designates a cup fitting friction-tight over the rear end of the hub and forming, in conjunction with said rear end, a lubricant-chamber 2. Cup 1 fits friction-tight upon the end of the hub, so that it can be removed to replenish chamber 2 with a lubricant and yet prevent leakage between it and the hub when in position upon said hub, as shown on Fig. 1.

The rear wall of cup 1 is of conical form to receive an annular felt, or other suitable sealing element 3, which prevents leakage of the lubricant through the joint between the opening in the cup and the spindle B. The sealing element 3, also prevents entrance of dust, sand, or other foreign matter to the lubricant-chamber 2.

The sealing element is forced tightly against the spindle B and the conical wall of cup 1, by a metallic washer 4, which in turn is forced against element 3 by a coil-spring 5, one terminal of which is secured by the clip F on the axle.

The front side of the cavity at the front end of the hub E is closed to form a lubricant chamber 6, by an annular plate 7 and a screw-plug 8. Plate 7 is permanently-secured to the front end of the hub by screws 9, or other suitable means, and the screw plug 8 has a hexagonal head 10, so that it can be readily removed with a wrench when it is desired to replenish chamber 6 with lubricant. Plate 7 is reinforced with an internally-threaded annulus 11, to receive the screw plug 10.

From the foregoing description it is apparent that I have produced a lubricator for wheels, which is simple and inexpensive in construction and well adapted to the purposes intended.

Having thus described my invention, what I claim and desire to secure by Letters Patent, is:

1. In combination with a hub and an axle, a cup having its free front end portion engaged over the hub periphery and having its opposite end provided with a wall which is inclined inwardly toward the axle, a sealing element having an inclined inner face which conformably engages the inclined wall of the cup, and an outer face which is at substantially right angles to the axles, a washer abutting the outer face of the sealing element, a coil spring surrounding the axle and abutting the washer, and a clip on the axle secured to the outer terminal of the spring.

2. In combination with a hub and an axle, a cup having its free front end portion engaged over the hub periphery and having its opposite end provided with a wall which is inclined inwardly toward the axle, a sealing element having an inclined inner face which conformably engages the inclined wall of
5 the cup, and spring means to normally force the sealing element into engagement with said inclined rear wall of the cup.

In testimony whereof I affix my signature in the presence of two witnesses.

JOHN H. PIBURN.

Witnesses:
E. C. LILLIAN,
F. G. FISCHER.

Copies of this patent may be obtained for five cents each, by addressing the "Commissioner of Patents, Washington, D. C."